(12) United States Patent
Shimizu

(10) Patent No.: US 6,944,579 B2
(45) Date of Patent: Sep. 13, 2005

(54) SIGNAL SEPARATION METHOD, SIGNAL PROCESSING APPARATUS, IMAGE PROCESSING APPARATUS, MEDICAL IMAGE PROCESSING APPARATUS AND STORAGE MEDIUM FOR RESTORING MULTIDIMENSIONAL SIGNALS FROM OBSERVED DATA IN WHICH MULTIPLE SIGNALS ARE MIXED

(75) Inventor: Junya Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 10/024,611

(22) Filed: Oct. 29, 2001

(65) Prior Publication Data

US 2002/0085741 A1 Jul. 4, 2002

(30) Foreign Application Priority Data

Nov. 1, 2000 (JP) ........................................ 2000-335123

(51) Int. Cl.$^7$ ........................... G06F 15/00; H03F 1/26; H04B 15/00
(52) U.S. Cl. ....................... 702/196; 702/197; 382/261; 382/265; 382/276; 348/610
(58) Field of Search ................................ 382/118, 128, 382/173, 176, 260, 261, 265, 276; 348/610; 702/189–199

(56) References Cited

U.S. PATENT DOCUMENTS

| | | | | |
|---|---|---|---|---|
| 5,261,007 A | * | 11/1993 | Hirsch | 704/237 |
| 5,706,402 A | | 1/1998 | Bell | 395/23 |
| 5,721,694 A | * | 2/1998 | Graupe | 702/191 |
| 5,999,956 A | | 12/1999 | Deville | 708/322 |
| 6,026,183 A | * | 2/2000 | Talluri et al. | 382/194 |
| 6,614,930 B1 | * | 9/2003 | Agnihotri et al. | 382/176 |

FOREIGN PATENT DOCUMENTS

| | | |
|---|---|---|
| JP | 06-021838 | 1/1994 |
| JP | 2000-242624 | 9/2000 |
| JP | 2002-528778 | 9/2000 |

OTHER PUBLICATIONS

Cardoso et al. ("Equivalent Adaptive Source Separation," IEEE Trans. Signal Processing, vol. 44, No. 12, Dec. 1996, pp. 3017–3030).*

Hassibi et al. ("H–Infinity Optimality of the LMS Algorithm," IEEE Trans. Signal Processing, vol. 44, No. 2, Feb. 1996, pp. 267–280).*

(Continued)

*Primary Examiner*—Bhavesh M. Mehta
*Assistant Examiner*—Yubin Hung
(74) *Attorney, Agent, or Firm*—Perman & Green, LLP; Louis Percello

(57) ABSTRACT

Signals are separated by introducing a function having a monotonously increasing characteristic like an exponential type function as a cost function, and applying an adaptive algorithm that minimizes that cost function in terms of a signal separation matrix. That is, there is provided a signal processing apparatus that separates and outputs an original signal from the observed signal $\underline{x}(t)$, in which multiple multidimensional signals are mixed, wherein the nonlinear function 21 is operated on an input observed signal $\underline{x}(t)$ and an estimated separation matrix $\underline{W}(t-1)$ estimated at a previous cycle. Then, an error signal $\underline{e}(t)$ is calculated 22 based on $\underline{y}(t)$ formed by this nonlinear function 21, the estimated separation matrix $\underline{W}(t-1)$ estimated at the previous cycle, and the observed signal $\underline{x}(t)$ at that time. Then, based on the calculated error signal $\underline{e}(t)$, the update of the separation matrix $\underline{W}(t)$ at that time is performed 23 such that consideration weight is increased when estimation errors are large using the cost function having a monotonously increasing characteristic.

20 Claims, 10 Drawing Sheets

OTHER PUBLICATIONS

"Information Capacity of Channels With Partially Unknown Noise. I. Finite–Dimensional Channels", C.R. Baker et al., 1996, 18 pages.

"H∞ Filtering for Noise Reduction Using a Total Least Squares Estimation Approach", Jun'ya Shimizu et al., 1998, 4 pages.

"Least–Squares Methods for Blind Source Separation Based on Nonlinear PCA", Pajunen et al., International Journal of Neural Systems, vol. 8, Nos. 5 & 6, 1997, pp. 601–612.

"Equivariant Adaptive Source Separation", Cardoso et al., IEEE Transactions on Signal Processing, vol. 44, No. 12, 1996, pp. 3017–3030.

"Blind Separation of Sources, Part I: An Adaptive Algorithm Based on Neuromimetic Architecture", Jutten et al., Signal Processing vol. 24, No. 1, 1991, pp. 1–10.

"Stochastic ICA Contrast Maximisation Using OJA'S Nonlinear PCA Algorithm", Girolami et al., International Journal of Neural Systems, vol. 8, No. 5 & 6, 1997, pp. 661–678.

* cited by examiner (c)

(b) Original images (a)

Mixed images (a)

(b)

(c)

Separated images (c)

(b)

(a)

SIGNAL SEPARATION METHOD, SIGNAL PROCESSING APPARATUS, IMAGE PROCESSING APPARATUS, MEDICAL IMAGE PROCESSING APPARATUS AND STORAGE MEDIUM FOR RESTORING MULTIDIMENSIONAL SIGNALS FROM OBSERVED DATA IN WHICH MULTIPLE SIGNALS ARE MIXED

DETAILED DESCRIPTION OF THE INVENTION

1. Field of the Invention

The present invention relates to a signal separation method for separating specific multidimensional signals from observed data, and more particularly to a signal separation method for stably estimating and separating specific multidimensional signals when multiple signals have been observed in a mixed state.

2. Background Art

As seen in an example of the observation of multiple frames in which text have been overwritten on a background image for such as moving pictures, there are situations where multiple multidimensional signals that are originally independent are mutually mixed and observed in plural conditions. A technique for determining signals prior to mixture only from observed signals, in which multiple multidimensional signals have been mixed mutually, is expected to be used in various fields in the future. These fields include, for example, separation between character information and image information when acquiring images from a scanner or the like, restoration of medical images for extracting necessary information, enhancement and restoration of blurred images, noise reduction by image reconstruction using feature extracting components of observed images contaminated by noise, classification and recognition of face data and multidimensional data using feature extracting components of observed multidimensional signals such as an image, etc.

FIG. 1 depicts a conceptual diagram showing signal separation problems for separating original signals, assuming only the mutually statistical independence of signals when multiple signals are observed in a mixed state. FIG. 1 is formulated as follows. First, assume that there are m signals of scalar values $s_1(t), \ldots, s_m(t)$ for each index t, which are mutually statistically independent and have zero mean. Each signal s is to be obtained by appropriately transforming a multidimensional matrix into vectors such that two-dimensional signals are transformed into a line of vectors in a raster scan order, for example. However, an arithmetic expression may be modified equivalently such that the observed signals are dealt with as a matrix as it is.

FIG. 1 shows two signal sources $s_1$ and $s_2$ by way of example. For this, n linear weighted sums $x_1(t), \ldots, x_n(t)$ are to be observed, which is expressed as follows and observed by an observation apparatus.

$$\underline{x}(t) = \underline{A}\underline{s}(t) \qquad \text{[Equation 1]}$$

where each element is represented as follows.

$$\underline{x}(t) = [x_1(t)x_2(t) \ldots x_n(t)]^T$$

$$\underline{s}(t) = [s_1(t)s_2(t) \ldots s_m(t)]^T \qquad \text{[Equation 2]}$$

where it is assumed to be $n \geq m$. Furthermore, assuming that $n \times m$ mixing matrix is $\underline{A}$, which is to be a full rank matrix, i.e., a matrix where an inverse matrix of $m \times m$ matrix $\underline{A}^H\underline{A}$ exists. Hereinafter, a lowercase letter with an underline represents a vector, an uppercase letter with an underline represents a matrix, a superscript T represents transposition, and a superscript H represents Hermitian conjugate (i.e., conjugate transposition).

A problem of estimating a separation matrix $\underline{W}$ for obtaining a separation signal $\underline{y}(t)$ from this observed signal $\underline{x}(t)$ is a so-called signal separation problem. That is, when obtaining a separation signal $\underline{y}(t) = \underline{W}^H \times \underline{x}(t)$ using a signal separation apparatus from an observed signal $\underline{x}(t)$, which was observed by an observation apparatus shown in FIG. 1, estimation of a separation matrix $\underline{W}$ becomes a problem.

Next, a summary of the concept for estimating a separation matrix $\underline{W}$ will be described.

Assuming that a multivariable probability density function of a signal vector serving as observed signal $\underline{x}(t)$ is $p_u(\underline{u})$ and a probability density function for each element of the vector is $p_i(u_i)$, a mutual information of an observed vector is represented by the following Kullback-Leibler divergence.

$$I(\underline{u}) = \int p_u(\underline{u}) \log\left(\frac{p_u(\underline{u})}{\prod_{i=1}^{n} p_1(u_1)}\right) d\underline{u} \qquad \text{[Equation 3]}$$

where the mutual information is always positive and when it is zero shows that the elements of each signal vector are independent. In fact, if the signal vector elements are independent each other, the density function of the signal vector is represented by the following equation, so that the above equation becomes zero.

$$p_u(\underline{u}) = \prod_{i=1}^{n} p_i(u_i) \qquad \text{[Equation 4]}$$

Therefore, one of the rationales of signal separation technique is that the original signals are able to be restored from the mixed observed signals by finding a transformation matrix that minimizes the mutual information of signal vectors for observed signal vectors.

However, as the probability distribution of original signals is practically unknown, the mutual information can not be made directly to be an object of minimization operation. Therefore, the signal separation is often performed by optimizing a valuation amount that is equal or approximately equal to the mutual information. For example, literature 1 "International Journal of Neural Systems", vol. 8, Nos. 5 & 6, pp. 661–678, October/December 1997, describes that a mutual information is able to be minimized if finding a transformation matrix $\underline{W}$ that optimizes the sum of the fourth-order cumulants with a zero time delay for each original signal (i.e., maximizing if the kurtosis is positive or minimizing if the kurtosis is negative), on the condition that the observed signals have a kurtosis with the same sign, a covariance matrix is bounded, whitening has been performed, and a separation matrix $\underline{W}$ is a unitary matrix (i.e $\underline{W}^H\underline{W} = \underline{I}$ (unit matrix)). Note that the kurtosis refers to a numeric obtained by the following calculation for an observed signal $u_i$.

$$E\{u_i^4\} - 3[E\{u_i^2\}]^2 \qquad \text{[Equation 5]}$$

where $E[\cdot]$ represents an expectation operation. The whitening means making signal vectors uncorrelated each other to make the variance 1, the fourth-order cumulant is a statistic represented by the following equation.

$$c_4(k_1, k_2, k_3) = E\{u_i(t)u_i(t+k_1)u_i(t+k_2)u_i(t+k_3)\} - \quad \text{[Equation 6]}$$
$$E\{u_i(t)u_i(t+k_1)\}E\{u_i(t+k_2)u_i(t+k_3)\} -$$
$$E\{u_i(t)u_i(t+k_2)\}E\{u_i(t+k_1)u_i(t+k_3)\} -$$
$$E\{u_i(t)u_i(t+k_3)\}E\{u_i(t+k_1)u_i(t+k_2)\}$$

The zero time delay means that $k_1$, $k_2$ and $k_3$ are zero in the above equation.

However, generally, as a load of calculation is heavy when calculating high order statistics such as cumulants, a technique is employed such as calculating and approximating another information amount equivalent to a mutual information or minimizing a cost function equivalent to what optimizes the sum of cumulants by introducing a nonlinear function that can approximate the fourth-order cumulants. U.S. Pat. No. 5,706,402 discloses a method for finding a separation matrix by the gradient method using an unsupervised learning algorithm that optimizes output entropy instead of minimization of mutual information.

Though literature 2 (Signal Processing, vol. 24, No. 1, pp. 1–10, July 1991) does not manifest mutual information and cumulants, it discloses a method for using an approach similar to it, wherein a square of the residual that results from subtracting a linear sum of estimated signals from the observed signal is made to be a cost function and finding a separation filter that minimizes the cost function by the gradient method. Moreover, Japanese Unexamined Patent Publication No. 2000-97758 discloses a method for improving the convergence by normalizing updated amounts of the above method.

Literature 3 (IEEE Transactions on Signal Processing, vol. 44, No. 12, pp. 3017–3030, December 1996) proposes an estimation method, wherein a nonlinear function that approximately finds the fourth-order cumulants is introduced, then updated amounts to optimize the cost function in an adaptive algorithm based on that nonlinear function are determined based on the relative gradient. This technique improves the convergence speed of the conventional adaptive algorithm, which uses a gradient of the cost function as the updated amount, and which is equivalent to the natural gradient that may be introduced from information geometric considerations.

Stability in the convergence process of the separation matrix is important when restoring signals not in a steady state. In fact, in a series of gradient methods described above, it is often the case that the relation between the convergence speed and the stability is an inverse proportion. Thus, U.S. Pat. No. 5,999,956 uses a method that adds a module for reducing the effect on the estimation process even when there is a big change of power between estimated signals, and outputting stable results, in addition to a signal estimation module and a separation coefficient estimation module in order to achieve a stable convergence.

Furthermore, literature 4 (International Journal of Neural Systems, vol. 8, No. 5 & 6, pp. 601–612, October/December 1997) derives an adaptive algorithm based on the least squares method instead of the gradient method, when optimizing a cost function that introduced nonlinear function. Using this approach, as a step-size is not determined by a user like in the gradient method and what is optimal is determined automatically, the convergence speed is enhanced and the stability is achieved under a given condition.

[Problems to be Solved by the Invention]

Like the technique of literature 4 above, within the framework of the least squares method, it has been considered that a fast and appropriate convergence is often achieved, since a step-size is calculated to be optimal under the cost function. However, there is not necessarily the conformance between the situation where the signal separation is required and the format of the cost function which the above prior art techniques including the gradient method have been employed, so that there is a case where it seems not to be best even when using the framework of the least squares method.

For example, in the case of moving pictures, there would be a little change of images in adjacent frames. Therefore, it is easily assumed that an original signal is mixed in the adjacent frames at a similar ratio, where a component of each column (or each row) has about the same value when representing the mixing ratio as a matrix element. In such a case, as the condition number of the mixing matrix becomes large, the perturbation in the estimation process of the separation matrix would have large effects in estimates. Note that the condition number refers to an amount defined by $\|\underline{Z}\|\cdot\|\underline{Z}^{-1}\|$ using some norm $\|\cdot\|$ for a matrix $\underline{Z}$, where $\underline{Z}^{-1}$ represents an inverse matrix of a matrix $\underline{Z}$.

Therefore, in the conventional format of the cost function, much time is spent for obtaining normal estimates when the perturbation is large, which is likely to be a problem. Further, it is another problem that when the condition number is not large, the convergence speed becomes slower than the conventional cost function in the stage where errors still remain in the estimation process.

The present invention is proposed in view of above technical problems, therefore, its object is to stably extract original (and separate) signals from multiple signals by a few calculation steps when multiple signals including multidimensional signals have been observed in a mixed state.

It is another object of the invention to provide a least squares type method of which convergence speed is faster based on the cost function that reflects the change of perturbation by proper weighting, when the perturbation on estimates is large upon signal separation for observed signals, in which multiple signals including multidimensional signals are observed in a mixed state.

SUMMARY OF THE INVENTION

In order to achieve the above purposes, the present invention introduces a function having a monotonously increasing characteristic like an exponential type function as a cost function, which has an effect equivalent to minimizing a mutual information of observed signals, and applies an adaptive algorithm that minimizes (optimizes) that cost function in terms of a signal separation matrix. As this optimization of the exponential type function obtains the results equivalent to the optimization of H-infinity norms and the optimization by a solution of 2-person zero-sum game for the game theory, so-called MinMax strategy, it is also possible to estimate a signal separation matrix by an adaptive algorithm from H-infinity norms and MinMax strategy. That is, the present invention provides a signal separation method for restoring original multidimensional signals from observed data where multiple multidimensional signals are mixed, the method comprising the steps of: selecting a specific separation matrix by optimizing at least either one of H-infinity norm type of cost function or MinMax strategy type of cost function for the observed data; and multiplying the observed data by the selected separation matrix to restore the original multidimensional signals.

These original multidimensional signals refer to, for example, original signals composed of multidimension such as original image signals.

In another aspect of the present invention, there is provided a signal separation method for estimating and restoring original multidimensional signals from observed data where multiple signals including the original multidimensional signals are mixed, the method comprising the steps of: introducing a cost function for the observed data, the cost function being based on a function that has a monotonously increasing characteristic; estimating a separation matrix using an adaptive filter that optimizes the introduced cost function; and multiplying the observed data by the estimated separation matrix to estimate and restore the original multidimensional signals.

The step of estimating a separation matrix comprises using the adaptive filter that minimizes the cost function in terms of the separation matrix, wherein the introduced cost function is an exponential type function, thereby reducing the time for calculating the normal estimates even when the perturbation on estimates is large in the estimation process of the separation matrices.

Multiple signals that are included in the observed data may comprise other multidimensional signals or one-dimensional signals as well as the original multidimensional signals.

In another aspect of the invention, there is provided a method for separating and extracting original signals from observed signals where multiple multidimensional signals including the original signals are mixed, the method comprising the steps of: reading the observed signals; transforming a data structure in terms of the read observed signals; subtracting an average of the observed signals of which data structure has been transformed to perform zero averaging; performing whitening on the observed signals that have undergone zero averaging; performing separation processing on the observed signals that have undergone whitening based on a cost function having a monotonously increasing characteristic; and performing inverse whitening as post-processing on the observed signals that have undergone the separation processing. A nonlinear function used in the cost function in the separation processing can be changed based on kurtosis of the read observed signals.

In a further aspect of the invention, there is provided a signal processing apparatus, comprising: means for inputting observed data where multiple signals including original multidimensional signals are mixed; means for selecting a specific separation matrix by optimizing at least either one of H-infinity norm type of cost function or MinMax strategy type of cost function for the input observed data; and means for multiplying the observed data by the selected separation matrix to estimate and restore the original multidimensional signals.

In a further aspect of the invention, there is provided a signal processing apparatus, comprising: means for inputting observed data where multiple multidimensional signals that are originally independent are mixed mutually; means for estimating a separation matrix by using an adaptive filter for the input observed data, the filter optimizing a cost function based on a function that has a monotonously increasing characteristic; and means for multiplying the observed data by the estimated separation matrix to estimate and restore the specific multidimensional signals.

The observed data input by the input means comprises given image data that consist of mixtures of moving picture data that are considered as three dimensional data, whereby multiple multidimensional signals containing moving pictures that are originally independent are separated stably.

In a further aspect of the invention, there is provided an image processing apparatus, comprising: means for inputting mixed image data where multiple image signals are mixed; means for estimating a separation matrix by using an adaptive filter for the input mixed image data, the filter optimizing a cost function (i.e., minimizing the cost function in terms of the separation matrix) based on a function that has a monotonously increasing characteristic as typified by an exponential type function; and means for multiplying the mixed image data by the estimated separation matrix to separate and extract the image signals from the mixed image data.

The input mixed image data comprises text overwritten on a background image and are observed as multiple frames, wherein the image data prior to mixture can be determined even when multiple image data that are originally independent are mixed mutually in multiple states.

The image signals that are separated and extracted are image signals that are used in face recognition and distinction in biometrics or image signals that are obtained by the observation and measurement by satellites, wherein the present invention can be used effectively for an image processing apparatus that is applied in these fields.

In a further aspect of the invention, there is provided a medical image processing apparatus, comprising: means for inputting medical image data where a signal change of which interference process is unknown is contained in observed bio-image signals such as fMRI (functional magnetic resonance imaging); means for estimating a separation matrix by using an adaptive filter for the input medical image data, the filter optimizing a cost function based on a function having a monotonously increasing characteristic; and means for multiplying the medical image data by the estimated separation matrix to separate and extract the observed bio-image signals from the medical image data.

In a further aspect of the invention, there is provided a storage medium tangibly embodying a program readable and executable by a computer, the program comprising: processing for introducing a cost function for observed data where multiple multidimensional signals are mixed, the cost function being based on a function that has a monotonously increasing characteristic; processing for estimating a separation matrix using an adaptive filter that optimizes the introduced cost function; and processing for multiplying the observed data by the estimated separation matrix to estimate and restore the specific multidimensional signals. Also, the program comprises: processing for selecting a specific separation matrix by optimizing at least either one of H-infinity norm type of cost function or MinMax strategy type of cost function for observed data where multiple multidimensional signals are mixed; and processing for multiplying the observed data by the selected separation matrix to estimate and restore the specific multidimensional signal.

These storage media include CD-ROM media, for example, wherein the program is read by a CD-ROM reader in a computer system and stored on a hard disk drive in the computer system to be executed.

Preferred Embodiments

Now the present invention will be described in detail with reference to the accompanying drawings.

A signal separation method according to the invention is applied to the field of extracting an accurate change of brain activity when restoring a medical image to extract necessary information from medical images such as fMRI (functional magnetic resonance imaging) It is also applied to extraction of an original image prior to blurring by enhancing and restoring a blurred image, or noise reduction by means of image reconstruction using feature extracting components of an observed image that is contaminated by noise. Furthermore, it is conceivable that the present invention will be applied to classification and recognition of face data or multidimensional data by means of feature extracting components of observed multidimensional signals of images or the like, including face recognition in biometrics or geographic analysis from satellites. That is, a signal separation method according to the present invention is widely applicable to a problem that needs to separate original signals only from signals where a general multidimensional signal train is observed in mixed state, irrespective of the state of the digital observed signals or analog observed signals, complex signals or real signals, etc., wherein the application of its derivative forms may be widely derived, so being not limited to the above examples. Note that a signal separation technique according to the present invention can be useful with a dedicated apparatus or a terminal, as well as a computer system having a variety of memories, controllers, and a display, etc.

Next, a signal separation method according to the present invention will be described in detail. First, by introducing a nonlinear function that can approximate a fourth-order cumulant into a cost function and making its minimization have a meaning equivalent to minimization of mutual information, a scheme to estimate a separation matrix represented as follows is considered.

$$\text{Separation Matrix } \hat{\underline{W}} \qquad \text{[Equation 7]}$$

Conventionally, a cost function used in such a scheme is the following format.

$$E\{\|\underline{x}-\hat{\underline{W}}\underline{f}(\hat{\underline{W}}^H\underline{x})\|^2\} \qquad \text{[Equation 8]}$$

where $\underline{f}(\cdot)$ is a vector that has a nonlinear function such as tan h$(\cdot)$ as an element.

According to the present invention, a signal separation method is proposed that minimizes the following type of cost function in terms of the above separation matrix. That is, $$J_1(\hat{\underline{W}})=\gamma^2 \ln E\{\exp(\gamma^{-2}\|\underline{x}-\hat{\underline{W}}\underline{f}(\hat{\underline{W}}^H\underline{x})\|^2)\} \qquad \text{[Equation 9]}$$

Then, assuming that a difference between an initial true value of the separation matrix and an estimated initial value, and a noise generated in the estimation process are zero mean and decorrelated, and an estimated noise is a white random variable having unit variance. A white random variable means that $v_i$ and $v_j$ for any i and j (i≠j) are an independent stochastic variable in a variable series $[v_k]$. In the description below, an index (t) may be added instead of a hat symbol that indicates an estimate of the separation matrix, as long as there is no need to distinguish between a true value and an estimated value.

Minimization of the above cost function means minimization of the following equation in view of that a logarithmic function ln$(\cdot)$ is a monotonously increasing function.

$$E\{\exp(\gamma^{-2}\|\underline{x}-\hat{\underline{W}}\underline{f}(\hat{\underline{W}}^H\underline{x})\|^2)\} \qquad \text{[Equation 10]}$$

In addition, though various proposals have been provided as to what kind of nonlinear function should be used, it is common to use threshold processing for changing a function to be used depending on whether the kurtosis of the observed signals is positive or negative, thereby selecting a function that enables an appropriate approximation of high order cumulants. Other various types of forms are also conceivable. Functions to be used include tan h(u), $u^3$, or u−tan h(u), etc. For example, u−tan h(u) is used when the kurtosis is positive, while tan h(u) is used when the kurtosis is negative.

FIG. 2 depicts a block diagram showing a first algorithm for estimating a separation matrix that minimizes a cost function. The algorithm shown in FIG. 2 is represented as follows.

$$\underline{y}(t) = \underline{f}(\underline{W}^H(t-1)\underline{x}(t)) \qquad \text{[Equation 11]}$$
$$\underline{h}(t) = \underline{P}(t-1)\underline{y}(t)$$
$$\underline{g}(t) = \underline{h}(t)/[\beta+\underline{y}^H(t)\underline{h}(t)]$$
$$a = 1-\gamma^{-2}$$
$$\xi = \{\beta+\underline{y}^H(t)\underline{h}(t)\}/\{\beta+a\underline{y}^H(t)\underline{h}(t)\}$$
$$\underline{P}(t) = \frac{1}{\beta}\{\underline{P}(t-1)-a\xi\underline{g}(t)\underline{h}^H(t)\}$$
$$\underline{e}(t) = \underline{x}(t)-\underline{W}(t-1)\underline{y}(t)$$
$$\underline{W}(t) = \underline{W}(t-1)+\underline{e}(t)\underline{g}^H(t)$$

FIG. 2 depicts a flow of main algorithm by a nonlinear function 21, calculation of an error signal $\underline{e}(t)$ 22, update of $\underline{W}(t)$ 23, and a unitarization operation 24, wherein various amounts necessary for this main algorithm are calculated by each unit including calculation of $\underline{h}(t)$ 25, calculation of $\underline{g}(t)$ and $\xi$ 26, and calculation of $\underline{P}(t)$ 27. $z^{-1}$ is a delay for timing adjustment. As shown in FIG. 2 and the above algorithm, first an observation signal $\underline{x}(t)$ is input, and then $\underline{y}(t)$ is calculated by the nonlinear function 21 that is determined depending on whether the kurtosis is positive or negative. This nonlinear function 21 is constituted such that the nonlinear function 21 is operated on a product of an estimated separation matrix $\underline{W}(t-1)$ that was estimated at a previous time (i.e., previous cycle) and an observed signal $\underline{x}(t)$ at a present time. Thereafter, $\underline{y}(t)$ is input to the calculation of an error signal $\underline{e}(t)$ 22, where a difference is calculated between the observed signal $\underline{x}(t)$ at that time and a product of the estimated separation matrix $\underline{W}(t-1)$ at a previous time (i.e., previous cycle) and the calculated $\underline{y}(t)$. Next, the update of the separation matrix $\underline{W}(t)$ at that time is performed in a block 23. In this update of $\underline{W}(t)$ 23, $\underline{W}(t)$ is updated by multiplying $\underline{W}(t-1)$ estimated at the previous time by the error signal $\underline{e}(t)$ and $\underline{g}^H(t)$. The unitarization operation 24 is a step for assuring a unitary matrix after the update of $\underline{W}(t)$, where a given operation is preferably performed for improving the accuracy. This is expressed as follows.

$$\underline{W}(t)=\underline{W}(t)\{(\underline{W}(t)^H\underline{W}(t))^{-1}\}^{1/2} \qquad \text{[Equation 12]}$$

In the calculation of $\underline{h}(t)$ 25, $\underline{h}(t)$ is calculated from $\underline{P}(t-1)$ at the previous time and $\underline{y}(t)$. In the calculation of $\underline{g}(t)$ and $\xi$ 26, each value is calculated using a forgetting factor $\beta$. This forgetting factor $\beta$ is a constant of $0<\beta\leq 1$, which may be usually 1, however, when a matrix $\underline{W}$ to be estimated varies with time, this forgetting factor $\beta$ is set to smaller than 1 such as 0.99 or 0.98 to enable tracking for this varying. In the calculation of $\underline{P}(t)$ 27, $\underline{P}(t)$ is calculated, which is an inverse matrix of a covariance matrix of $\underline{y}(t)$, from $\underline{h}(t)$ calculated in the calculation of $\underline{h}(t)$ 25, input a, the forgetting factor $\beta$, and $\underline{g}(t)$ and $\xi$ calculated in the calculation of $\underline{g}(t)$ and $\xi$ 26. Note that initial values $\underline{P}(0)$ and $\underline{W}(0)$ are arbitrarily selected for these algorithms.

Now assuming that an observed signal $\underline{x}(t)$ undergoes preprocessing for transforming into a signal having a zero mean and performing whitening, before the above estimation processing of a separation matrix. This preprocessing is performed on the observed signal $\underline{x}(t)$ and needs no information of the original signal. Whitening means that each element of the observed signal vector is made uncorrelated to make the variance 1, a technique of which may not be specified and possible using eigenvalue decomposition or principal component analysis, for example.

In this way, the signal separation method according to the present invention is based on optimizing a cost function $J_1$ based on an exponential function in terms of a separation matrix. Therefore, from this point of view, a similar result would be obtained by using other algorithms. FIGS. 3 and 4 depict a configuration of the second algorithm. FIG. 3 depicts an overall configuration of a second algorithm, while FIG. 4 depicts an estimation filtering of $\underline{w}_i(t)$. This is what the first algorithm is transformed by deflation. In this second algorithm, optimization is performed by estimating a column vector one by one to reduce the order in turn, as shown in FIG. 3. For example, estimation filtering of $\underline{w}_1(t)$ is performed on the observed signal $\underline{x}_1(t)$ in block 31, then estimation filtering of $\underline{w}_2(t)$ is performed on the observed signal $\underline{x}_2(t)$ in block 32, and in the same manner, estimation filtering of $\underline{w}_m(t)$ is performed on the observed signal $\underline{x}_m(t)$ in block 33, thereby finally deriving the estimated separation matrix $\underline{W}(t)$. That is, in this second algorithm, an operation shown in FIG. 4 is repeated for each $\underline{x}_i(t)=\underline{x}(t)$, i=1, ..., m.

The algorithm shown in FIG. 4 is represented as follows.

$$y_i(t) = f(\underline{w}_i^H(t-1)\underline{x}_i(t))$$ [Equation 13]

$$\alpha = 1 - \gamma^{-2}$$

$$\underline{e}_i(t) = \underline{x}_i(t) - \underline{w}_i(t-1)y_i(t)$$

$$\xi = \frac{\beta d_i(t-1) + y_i(t)^* y_i(t)}{\beta d_i(t-1) + \alpha y_i(t)^* y_i(t)}$$

$$\frac{1}{d_i(t)} = \frac{1}{\beta}\left\{\frac{1}{d_i(t-1)} - \alpha\xi\frac{y_1(t)^* y_i(t)}{d_i(t-1)\{\beta d_i(t-1) + y_i(t)^* y_i(t)\}}\right\}$$

$$\underline{w}_i(t) = \underline{w}_i(t-1) + \underline{e}_i(t)[y_i(t)^*/\{\beta d_i(t-1) + y_i(t)y_i(t)^*\}]$$

$$\underline{x}_{i+1}(t) = \underline{x}_i(t) - \underline{w}_i(t)y_i(t)$$

where $d_i(0)$ is any initial value, a superscript * represents conjugate. f(·) represents a nonlinear function such as tan h(·).

In FIG. 4, a flow of main algorithm is represented by a nonlinear function 41, calculation of an error signal $\underline{e}_i(t)$ 42, update of $\underline{w}_i(t)$, and update of $\underline{X}_{i+1}(t)$ 45, wherein various amounts necessary for this main algorithm are calculated by each unit including calculation of $\xi$ 46 and calculation of $d_i(t)$ 47. $z^{-1}$ is a delay for timing adjustment. The accuracy is enhanced by performing a unitarization operation when each $\underline{w}_i(t)$ is found or when all $\underline{w}_i(t)$ are found. For example, in the case of a real vector, Gram-Schmidt orthogonalization process may be applied, however, there is no need to restrict a method.

FIG. 5 depicts a flow of processing from data reading to data outputting according to the present invention. First, an observed signal $\underline{x}(t)$ that is composed of multidimensional signals is read (step 101), then a transformation of data structure is performed, which transforms matrix information such as an image into a vector (step 102). Thereafter, it is determined whether to use a predetermined function as a nonlinear function used in the algorithm or to change a function depending on the kurtosis (steps 103 to 105). That is, it is determined whether a predetermined function is used or not (step 103), if so, the predetermined function is set (step 104), otherwise the function is set depending on the determination of kurtosis (step 105). Next, zero averaging of the observed signal $\underline{x}(t)$ is performed, that is, an average of the observed signal $\underline{x}(t)$ is subtracted to make the average be zero (step 106), then whitening of the observed data is performed (step 107). Next, from the beginning of data to the end, or from the beginning to a predetermined data point, separation processing is recursively performed, which is based on an exponential function type of cost function according to the present invention (step 108), then the inverse whitening is performed as a post-processing (step 109), and finally the output result is obtained (step 110). As the separation processing, the configuration based on the first algorithm shown in FIG. 2 or the configuration based on the second algorithm shown in FIGS. 3 and 4 may be used.

Next, characteristic of a signal separation method according to the present invention will be described. As previously stated, a cost function that has been used before is the one that has the following form based on $H^2$ norm.

$$J_2(\hat{\underline{W}})=E\{\|\underline{\hat{x}}-\hat{\underline{W}}f(\hat{\underline{W}}^H\underline{x})\|^2\}$$ [Equation 14]

Such type of cost function estimates a separation matrix with equal consideration weight even when some kind of perturbation such as an estimation error is added to the estimated vector (represented by the following equation) or when the convergence is obtained.

$$\hat{\underline{x}}=\hat{\underline{W}}f(\hat{\underline{W}}^H\underline{x})$$ [Equation 15]

On the other hand, according to an exponential function type of cost function of the present invention, as the error increases, the consideration weight involved in cost function increases, so that the convergence is accelerated, while when close to convergence, a stable estimation is expected so as not to accelerate the unnecessary update. FIG. 6 depicts a conceptual diagram showing a degree of consideration of an error in the cost function. The horizontal axis shows the value of the error, while the vertical axis shows a degree of consideration. An approximate straight line in the drawing indicates the prior scheme, while a curved line with a downward convex shape indicates the scheme of the present invention. According to the present invention, in the initial stage of estimation where an estimation error is large, a large update is performed with an optimal update amount, while in the stage where the estimation proceeds, an appropriate update for fine tuning is performed steadily, so that consequently the estimated result with high-precision is obtained by a small number of steps.

As an example that greatly differs from the prior art, there is a case where the difference between frames is small when performing separation of character information and background information from adjacent frames in image sequences. At this time, components of each row or column of a mixing matrix $\underline{A}$ have the same value, wherein the condition number of the mixing matrix $\underline{A}$ becomes large. As the condition number becomes large, the perturbation of the estimation error or the like has a great influence, thus the prior scheme is likely to need extra steps for convergence even when a small perturbation occurs. On the other hand, according to the present scheme, as the consideration weight in the cost function becomes large when the large perturbation occurs, an effect equivalent to making a correction large is possible in the update equation in the algorithm. As a result, according to the present scheme, it is expected to accelerate the convergence. Of course, according to the present invention, as is evident from the above consideration that the convergence is accelerated compared with the prior scheme when the condition number is not large, so that the separation matrix with high-precision is expected to be estimated more quickly. That is, according to the present scheme, an update amount that tries to suppress an estimation error as much as possible is improved under a more appropriate cost function than the prior one.

Moreover, as is evident from the above algorithm, the present scheme is considered to have a structure of adaptive filtering, so that even when a mixing matrix $\underline{A}$ is time-varying such that the mixing ratio changes in the middle of images or the mixing ratio changes in the middle of images sequences, multidimensional signal separation with tracking the time-variation is enabled.

According to the above explanation, provided that an exponential function type of cost function is used and its calculation method is to optimize the cost function $J_1$, the present invention is not limited to the above-mentioned form. A similar algorithm may be derived from a cost function that is based on an approximate expression where an exponential function is expressed in a polynomial expansion, or a cost function that is based on a function having a similar monotonously increasing characteristic. Now, a cost function will be described, which has the same meaning as an exponential function type of cost function. That is, by deriving an estimation algorithm of a separation matrix based on two cost functions described below, an algorithm similar to the ones shown in FIGS. 2, 3 and 4 can be derived.

$$J_{11}(\hat{\underline{W}}) = \sup_{\underline{W}_0} \frac{E\{\|\underline{W}f(\underline{W}^H\underline{x}) - \hat{\underline{W}}f(\hat{\underline{W}}^H\underline{x})\|^2\}}{(\underline{W}_0 - \hat{\underline{W}}_0)^H \prod_0^{-1} (\underline{W}_0 - \hat{\underline{W}}_0) + E\{\|\underline{x} - \underline{W}f(\underline{W}^H\underline{x})\|^2\}} < \gamma^2 \quad \text{[Equation 16]}$$

$$J_{12}(\hat{\underline{W}}) = \min_{\hat{\underline{W}}} \max_{\underline{W}_0} \left[ E\{\|\underline{W}f(\underline{W}^H\underline{x}) - \hat{\underline{W}}f(\hat{\underline{W}}^H\underline{x})\|^2\} - \gamma^2 \left\{ (\underline{W}_0 - \hat{\underline{W}}_0)^H \prod_0^{-1} (\underline{W}_0 - \hat{\underline{W}}_0) + E\{\|\underline{x} - \underline{W}f(\underline{W}^H\underline{x})\|^2\} \right\} \right]$$

where $\underline{\Pi}_0$ is a positive-definite matrix representing a degree of uncertainty for an initial value $\underline{W}_0$, $\underline{W}$ is a true value of a separation matrix. Note that a positive-definite matrix means a matrix $\underline{M}$ where $\underline{v}^H\underline{M}\underline{v}$ becomes positive for all non-zero vectors $\underline{v}$.

$J_{11}$ is an H-infinity norm and the format of this cost function means that no matter how large an estimation error exists, a method can be derived which estimates a separation matrix, wherein the upper bound of $H^2$ norm of estimation errors is less than or equal to a predetermined scalar quantity. A cost function $J_{12}$ means that a method for optimization can be derived in a strategy using the MinMax theorem of the game theory, wherein a separation matrix that generates a minimum error is selected as a solution, from among the candidates of a maximal value of errors that arise for various separation matrices. What these cost functions mean is consistent with the features of the signal separation method derived from the exponential function type of cost functions described above.

Next, the results of the experiment will be described when applying a signal separation method according to the present invention, wherein three kinds of synthetic signals were prepared to conduct an experiment of their separation. These synthetic signals are as follows.

$r_1 = \sin(2\pi 60 t)$ $r_2 = \text{sign}(\sin 2\pi 500 t))$ $r_3$: random variables uniformly distributed between [Equation 17]

where the sampling frequency was 10 kHz, sign(·) represents a function that outputs a sign of (·).

The methods of the aforementioned literature 3 and literature 4 were used as a comparative object. The method of literature 3 is the one that is based on a relative gradient of which convergence is said to be fast among gradient methods, while the method of literature 4 is a conventional least squares type of algorithm. As a comparative object, the algorithm of the present invention shown in FIG. 2 is employed. It was assumed that a mixing matrix is generated from random variables that are uniformly distributed between [0, 1] and that the condition numbers are over 2000.

FIG. 7 depicts the results of convergence when conducting the independent trial ten times and taking an average of them in the experiment of separation. The horizontal axis represents the number of iterations, while the vertical axis represents an index value of convergence, wherein the characteristics of convergence by using synthetic signals are shown corresponding to when using a technique of literature 3, a technique of literature 4, and a technique of the present invention. As the characteristic index of convergence at this time, the following index used in the literature 4 is employed, which indicates that the precision of estimation becomes higher when approaching zero.

$$C = \sqrt{\sum_i \left( \sum_j \frac{|p_{ij}|^2}{\max_k |p_{ik}|^2} - 1 \right) + \sum_j \left( \sum_i \frac{|p_{ij}|^2}{\max_k |p_{kj}|^2} - 1 \right)} \quad \text{[Equation 18]}$$

where $p_{ij}$ represents (i, j) element of a matrix that is obtained as a product of an estimated separation matrix and a mixing matrix $\underline{A}$. As the technique of literature 3 requires that a user determines the update step-size, here a step-size that achieves the fastest convergence is used among the ones that achieve the convergence at the same level of stability as the present invention. However, as is evident from FIG. 7, the convergence speed of the technique of literature 3 is slower than the technique of the present invention. On the other hand, although a step-size can be automatically set to an optimal one according to the technique of literature 4 and the technique of the present invention, it is evident that the technique of the present invention achieves a faster convergence than the technique of literature 4.

As the result of examination of the number of FLOPS (Floating Operations Per Second), i.e., the number of floating operations that can be processed per second for respective techniques in the above experiment, it proved that the number of FLOPS for one step is nearly the same for the present invention and the literature 4. Therefore, it is understood that the total number of FLOPS to convergence is smaller for the technique of the present invention. On the other hand, comparing the literature 3 and the present invention, the number of FLOPS required for one step is smaller for the technique of literature 3, however, the simulation proved that the total number of FLOPS required for satisfying convergence is reduced to less than ⅔ by the present invention. When using the algorithms shown in FIGS. 3 and 4, nearly equal results can be obtained. Moreover, when not making the condition number of mixing matrix $\underline{A}$ an unfavorable condition like this simulation, a similar result can be obtained.

FIG. 8 through FIG. 10 are diagrams for illustrating the results of the separation of image signals by the present invention as an example of the separation of real signals. FIGS. 8(a) to 8(C) depict image signals composed of three original images, wherein FIG. 8(a) uses a part of the girl image to which the gray transformation was applied, this image existing in the standard image database SIDBA of University of Tokyo, while FIG. 8(b) uses a part of the standard high precision picture data SHIPP of the Institute of Image Electronics Engineers of Japan, to which the gray transformation was applied. FIGS. 9(a) to 9(c) depict mixed images where the original images shown in FIGS. 8(a) to 8(c) were mixed by using a mixing matrix, in which uniform random variables were generated. FIGS. 10(a) to 10(C) depict the results of separation according to the present invention. According to the separation scheme of the present invention, it proves that from the result of separation shown in FIG. 10(a), image signals of the original image shown in FIG. 8(a) are extracted. Furthermore, as is shown in FIGS. 10(b) and 10(c), it proves that image signals of the original images shown in FIGS. 8(b) and 8(c) are separated stably.

Note that there is a case where plus and minus signs are reversed against the signals of original images as the result of separation. However, in case of images, an obvious perception by sight is possible when a phase is deviated by π (i.e., relation between negative and positive), so that a measure can be taken by reversing the sign of the resulting signals of separation. As for the amplitude, a user may adjust appropriately. In the images shown in FIGS. 10(a) to (c), minimum and maximum values of luminance of obtained images were adjusted to a displayable range. Of course, information about signals of original images isn't necessary at all for these manipulations. Next, applications (1) to (4) of the signal separation method of the present invention will be described.

(1) Restoration of a medical image for extraction of necessary information

Though a medical image includes a variety of examples, let's consider the aforementioned fMRI (functional magnetic resonance imaging), for example. fMRI is used to observe the change of space distribution for brain activities with time when some kind of stimulus is given or when conducting an indicated action. As the fMRI observes its change based on the oxygen level in the blood, it is necessary to restore and extract information from weak signals. In order to associate an action for the observation objective with a brain active region accurately, an extra signal change due to the heart beat or the movement of a head should be removed. Like the conventional manner, accumulating the observed images for every observation time period and removing noise depending on whether the time series correlation of each pixel position is large or small, results in a problem where the time resolution deteriorates. Therefore, assuming that the change of brain activities due to an action and the change of brain activities due to other factors are independent, a more accurate extraction of the change of brain activities is expected compared with the conventional method, by using a method like the present invention for separating and extracting original signals adaptively and relatively fast at each time even if the interference process is unknown.

(2) Enhancement and restoration of blurred images

Applying the present invention, the enhancement and restoration of blurred images is performed by assuming each differential term of Taylor expansion of the blurred image the independent components and regarding the coefficients of Taylor expansion as the elements of the mixing matrix. According to the present invention, the original image prior to blurring can be extracted even if only the smaller number of observed images can be obtained compared with what was previously required, or with a smaller amount of calculation than the prior art.

3) Noise reduction by the image reconstruction using feature extracting components of the observed images contaminated by noise After classifying the observed images contaminated by noise into some independent components by the independent component analysis, noise reduction is performed by removing the components that are regarded as noise and synthesizing using an inverse matrix of the separation matrix. As the method of the present invention has tolerance to noise, more accurate independent components than the prior art can be extracted, thereby allowing more efficient noise reduction.

(4) Classification and recognition of face data and multidimensional data using feature extracting components of observed multidimensional signals such as an image.

By the independent component analysis of the observed signals (i.e., signal separation) and classifying the data by the obtained components, classification with higher-precision is expected compared with an analysis that considers up to the second-order statistic like before, since the data analysis is performed from information that considers high-order statistics. Also, the method of the present invention has tolerance when a signal is distorted or when the perturbation exists due to the slight difference of the observation direction, thereby allowing the robust data classification. Therefore, the present invention is applicable to face recognition or distinction in biometrics or distinction of images that are obtained by the observation and measurement by satellites (e.g., identifying a forest land, residential land, or sea, etc.).

As has been described in detail, according to the present invention, it becomes possible to stably separate an original signal from multiple multidimensional signals with faster convergence than the previous scheme, even when multiple multidimensional signals have been observed in a mixed state. The separation scheme according to the present invention is also useful in separation for moving pictures as well as image data containing color data such as RGB. Though the moving pictures are comprehended as three-dimensional images (i.e., X axis, Y axis and time axis), the great effect can be achieved when applying the present invention, since the time required for convergence could be greatly reduced.

[Advantages of the Invention]

In this way, according to the present invention, it is possible to stably extract an original signal from multiple signals by a few calculation steps when multiple signals including multidimensional signals have been observed in a mixed state.

DESCRIPTION OF THE SYMBOLS

Figure 1:
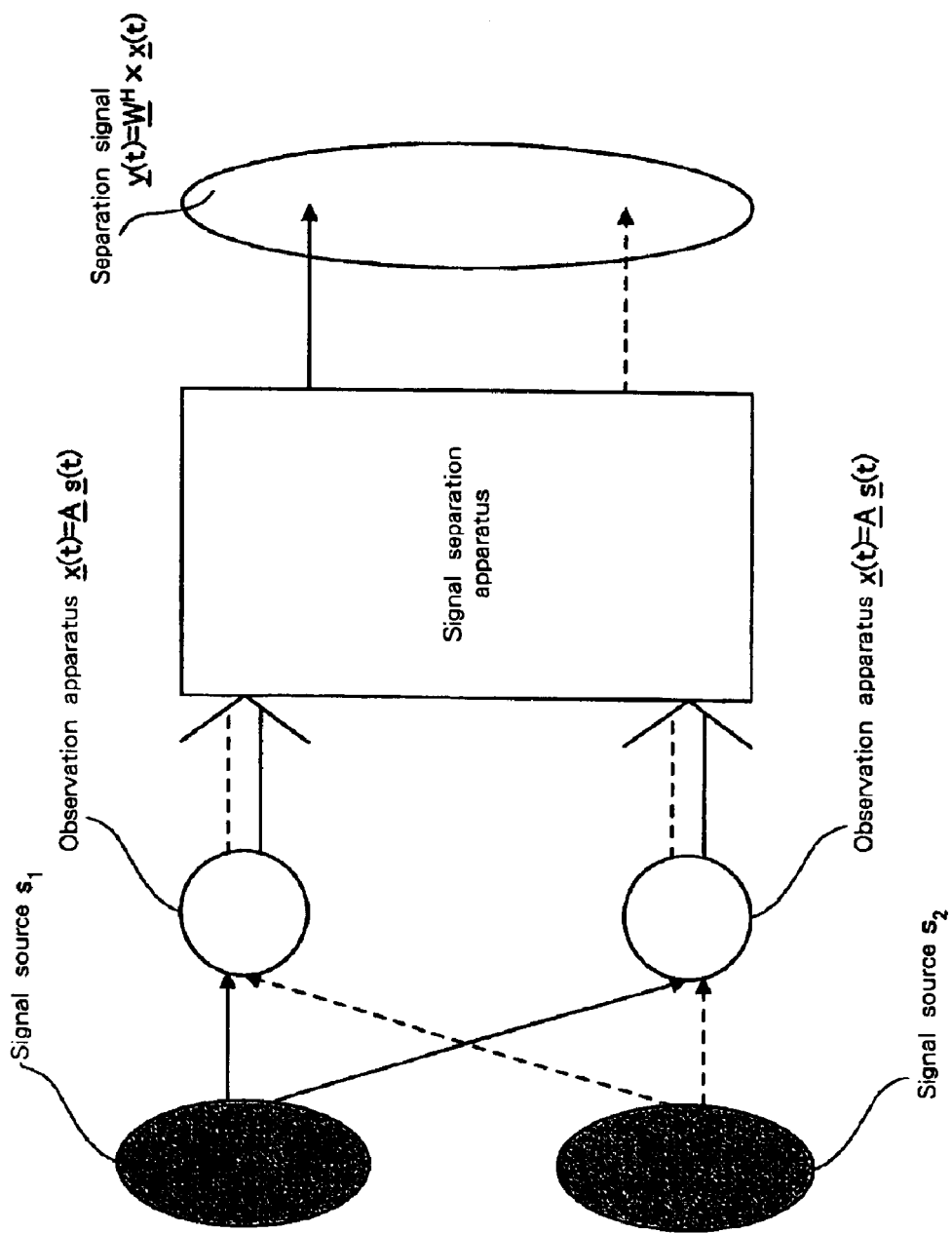
FIG. 1 depicts a conceptual diagram showing signal separation problems.
Figure 2:
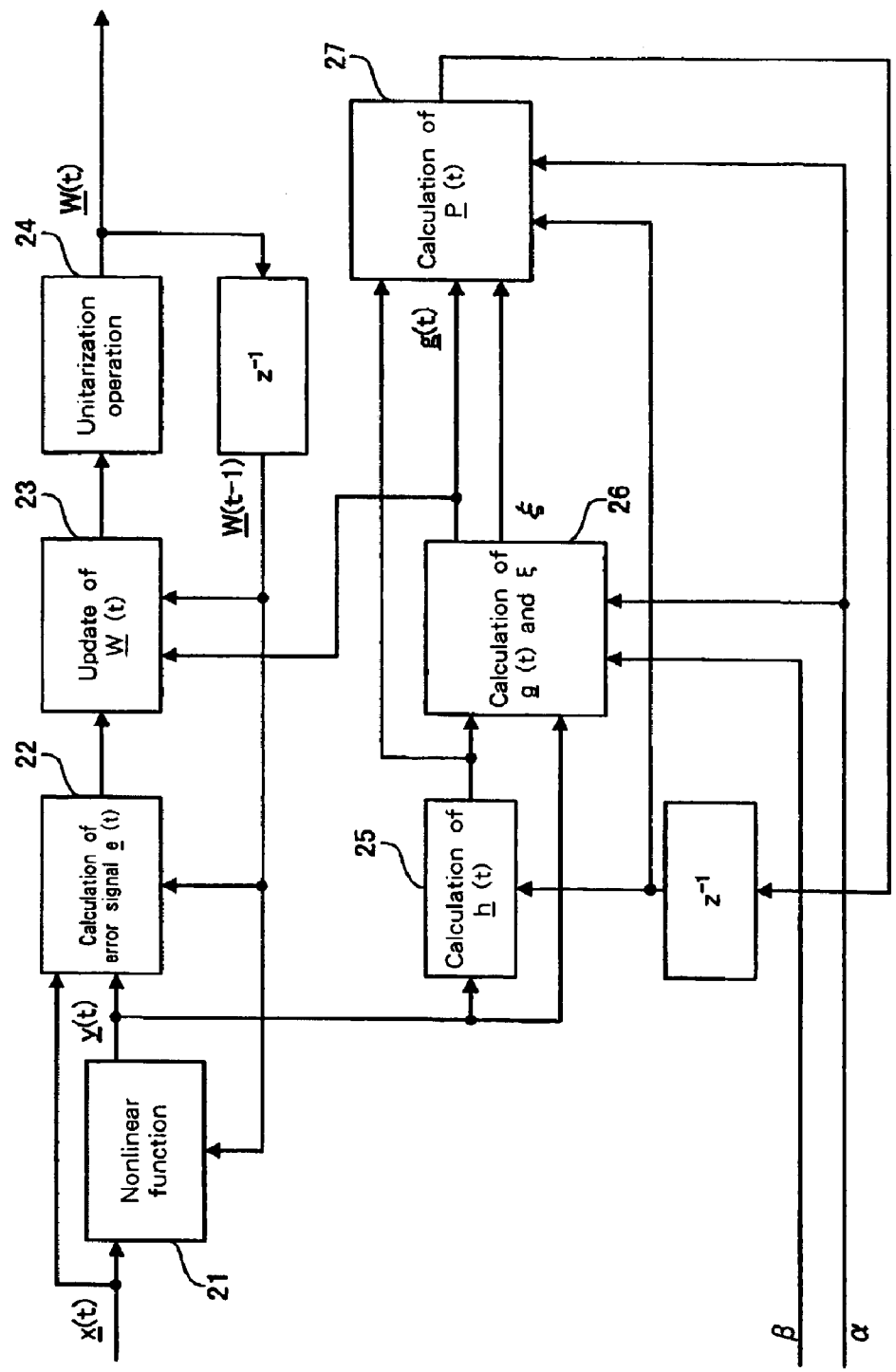
FIG. 2 depicts a block diagram showing a first algorithm for estimating a separation matrix that minimizes a cost function.
Figure 3:
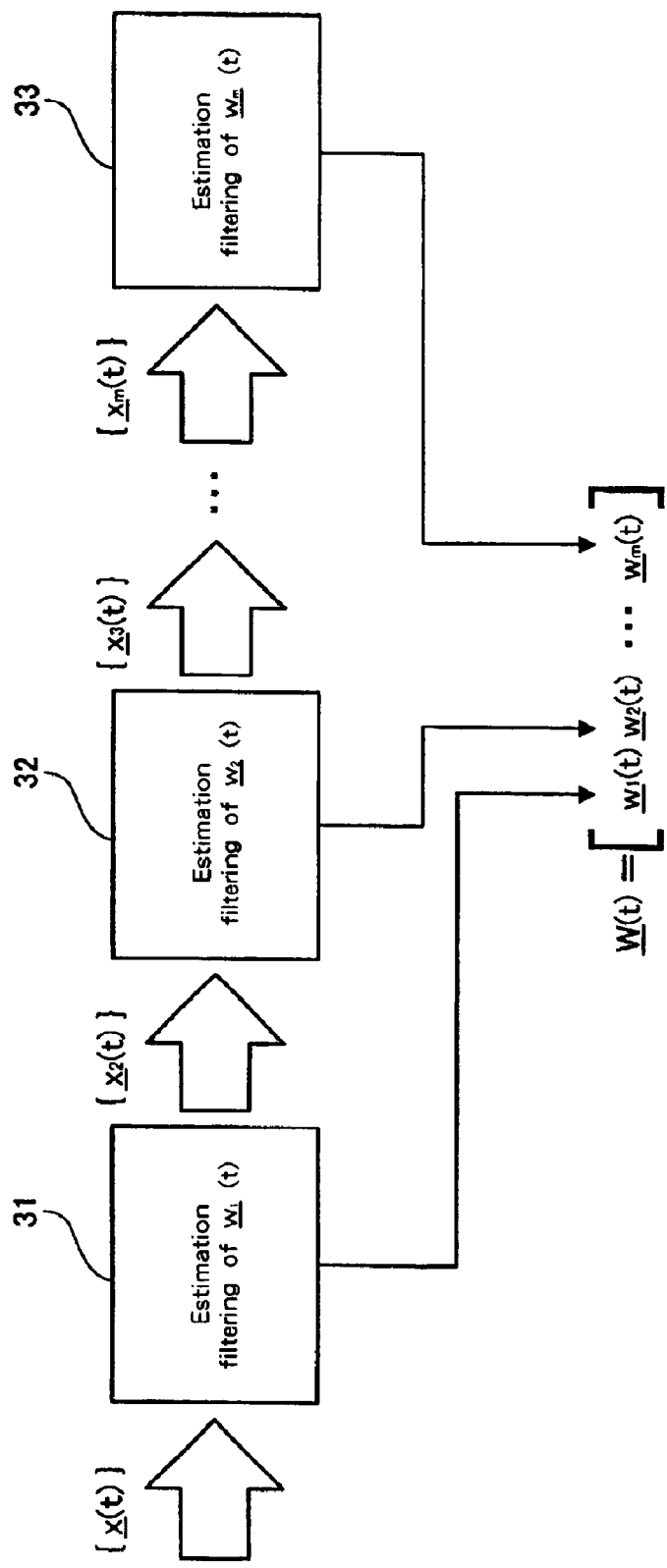
FIG. 3 depicts an overall configuration of a second algorithm.
Figure 4:
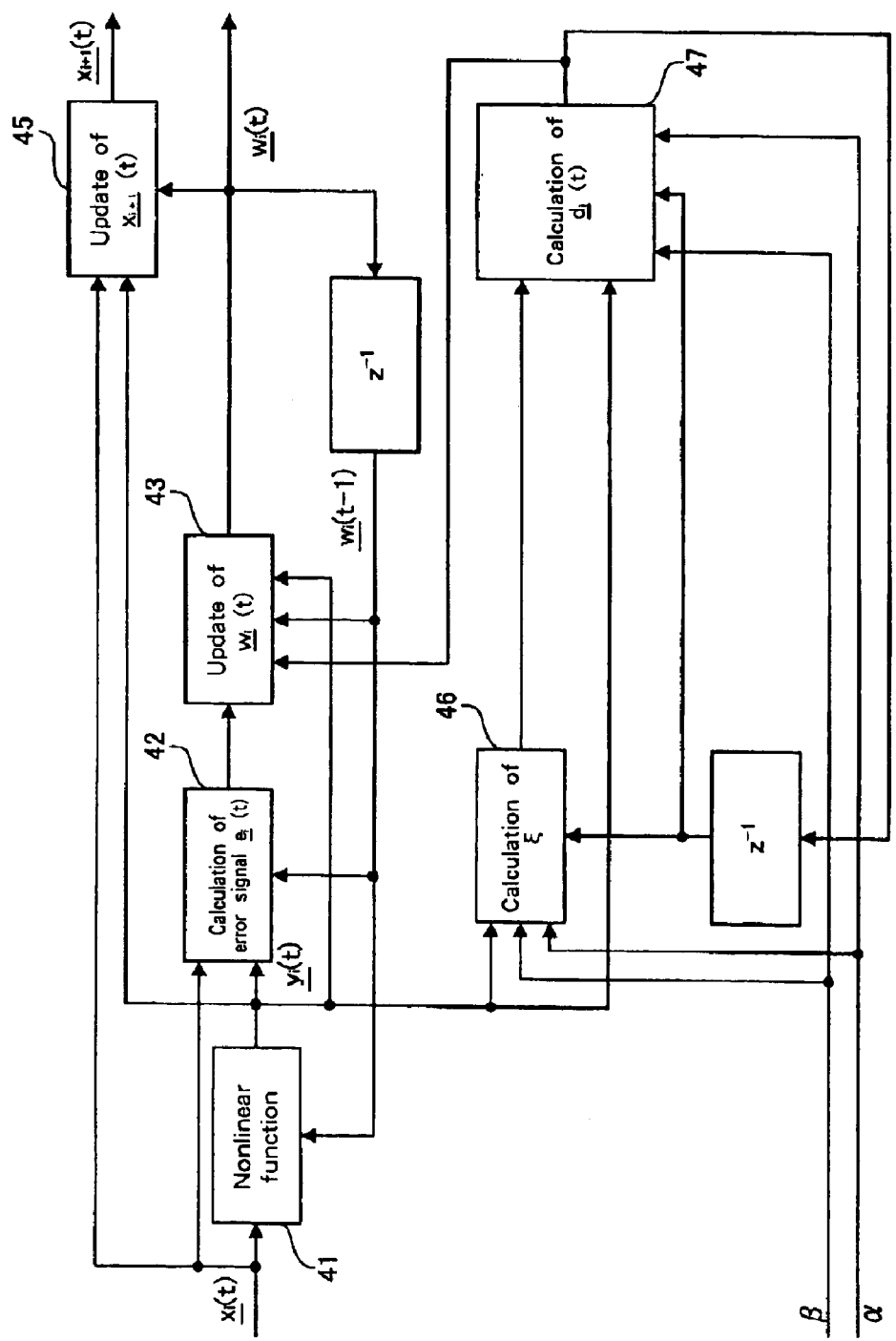
FIG. 4 depicts an estimation filtering of $\underline{w}_i(t)$ in a second algorithm.
Figure 5:
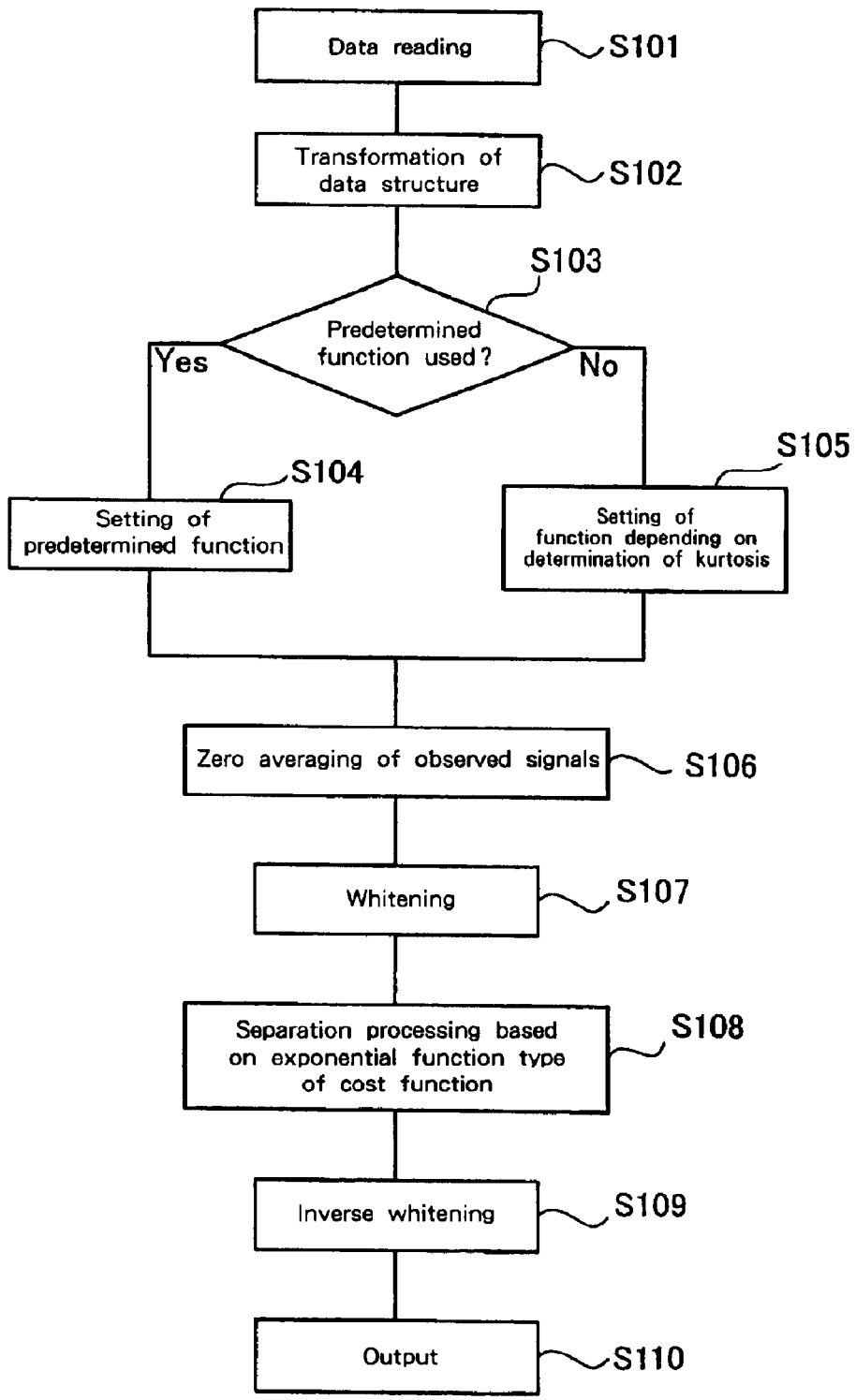
FIG. 5 depicts a flow of processing from data reading to data outputting according to the present invention.
Figure 6:
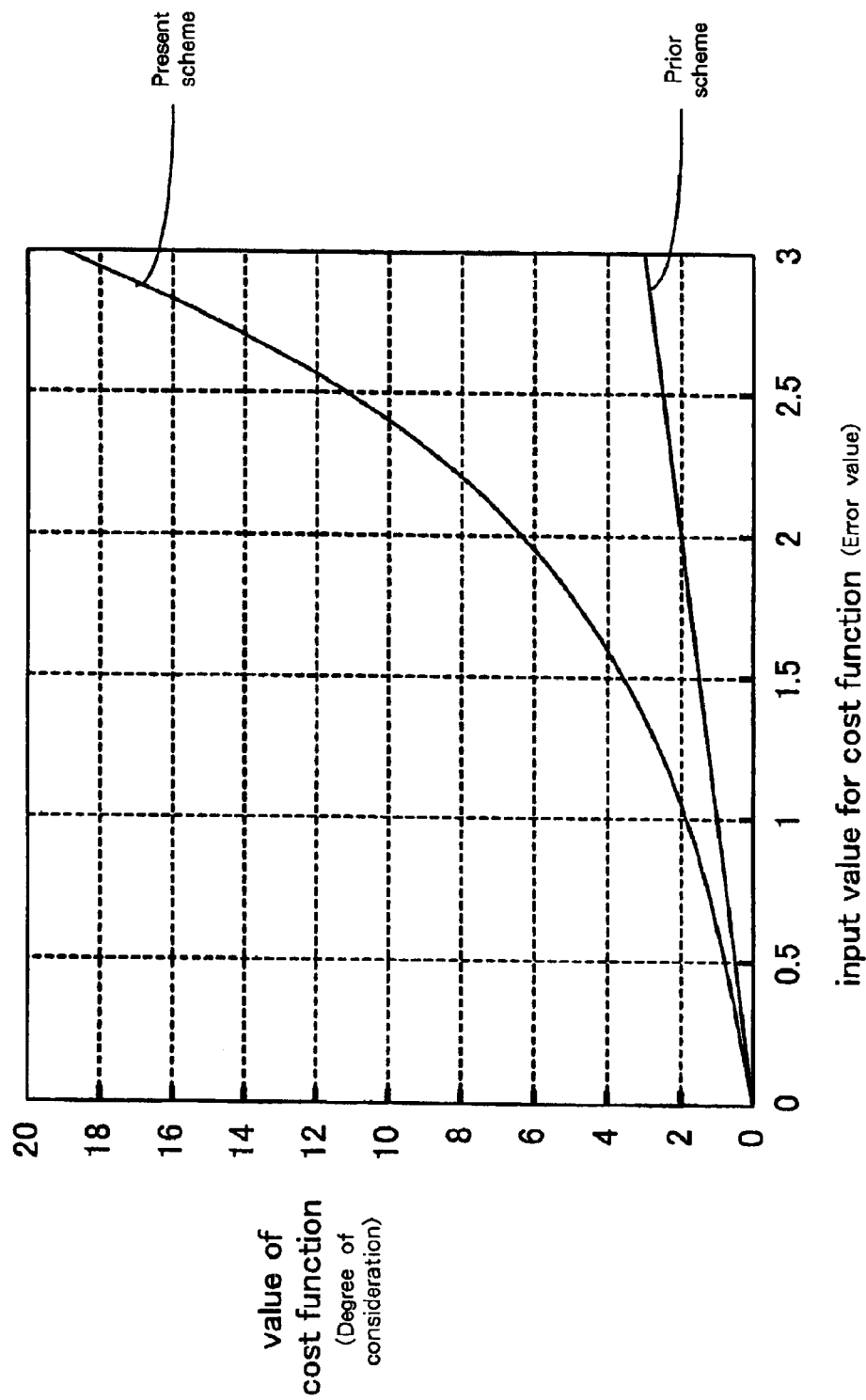
FIG. 6 depicts a conceptual diagram showing a degree of consideration of an error in the cost function.
Figure 7:
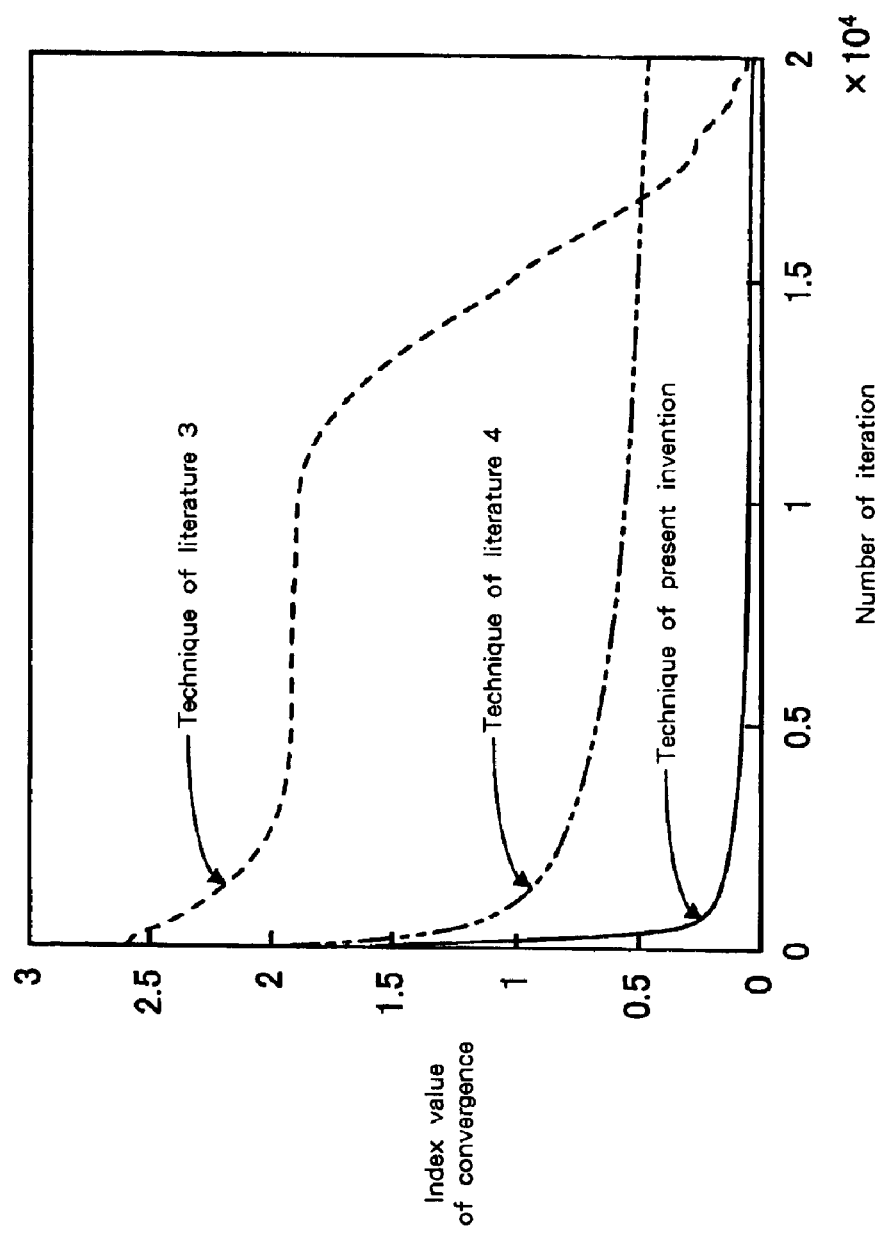
FIG. 7 depicts the results of convergence when conducting the independent trial ten times and taking an average of them in the experiment of separation.
Figure 8:
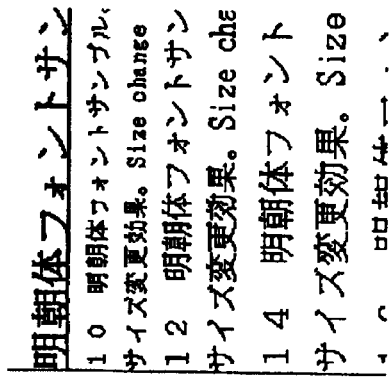
FIGS. 8(a) to 8(C) depict image signals composed of three original images.
Figure 8:
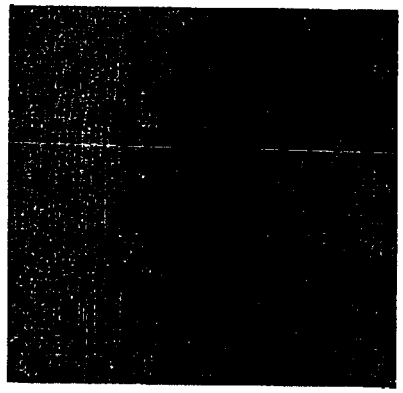
Figure 8:
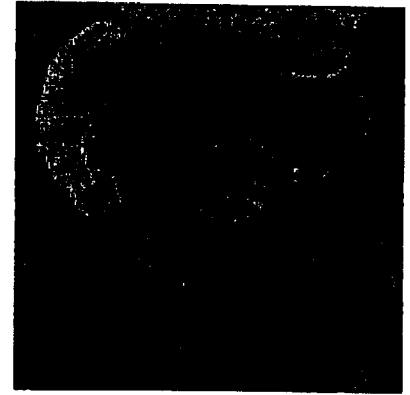
Figure 9:
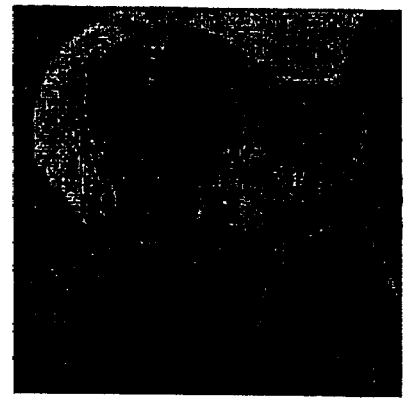
FIGS. 9(a) to 9(c) depict mixed images where the original images shown in FIGS. 8(a) to 8(c) were mixed by using a mixing matrix, in which uniform random variables were generated.
Figure 9:
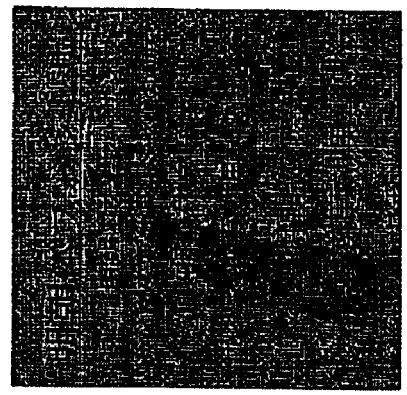
Figure 9:
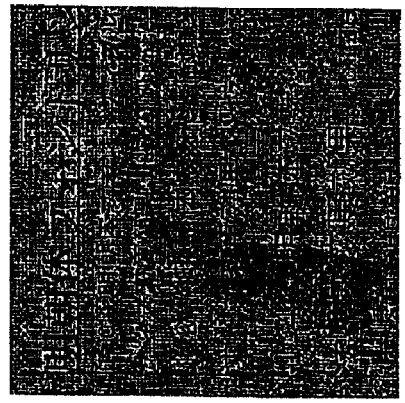
Figure 10:
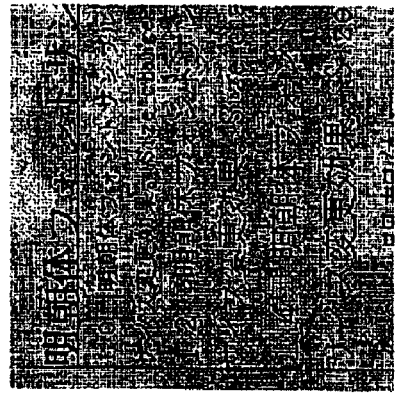
FIGS. 10(a) to 10(C) depict the results of separation according to the present invention.
Figure 10:
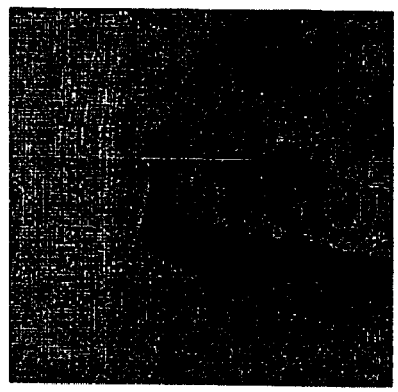
Figure 10:
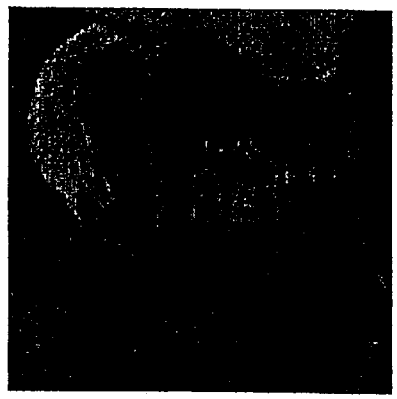

21: Nonlinear function
22: Calculation of error signal $\underline{E}(t)$
23: Update of $\underline{W}(t)$
24: Unitarization operation
25: Calculation of $\underline{h}(t)$
26: Calculation of $g(t)$ and $\xi$
27: Calculation of $\underline{P}(t)$
31: Estimation filtering of $\underline{W}_1(t)$
32: Estimation filtering of $\underline{W}_2(t)$
33: Estimation filtering of $\underline{W}_m(t)$
41: Nonlinear function
42: Calculation of error signal $\underline{e}_i(t)$
43: Update of $\underline{w}_i(t)$
45: Update of $\underline{X}_{i+1}(t)$
46: Calculation of $\xi$
47: Calculation of $\underline{d}_i(t)$

What is claimed is:

1. A signal separation method for restoring original multidimensional signals from observed data where multiple multidimensional signals are mixed, the method comprising the steps of:
   selecting a specific separation matrix by optimizing at least either one of H-infinity norm type of cost function or MinMax strategy type of cost function for said observed data; and
   multiplying the observed data by the selected separation matrix to restore the original multidimensional signals.

2. A signal separation method for estimating and restoring original multidimensional signals from observed data where multiple signals including the original multidimensional signals are mixed, the method comprising the steps of:
   introducing a cost function for the observed data, the cost function being based on a function that has a monotonously increasing characteristic;
   estimating a separation matrix using an adaptive filter that optimizes the introduced cost function; and
   multiplying the observed data by the estimated separation matrix to estimate and restore the original multidimensional signals.

3. The method according to claim 2, wherein the step of estimating a separation matrix comprises using the adaptive filter that minimizes the cost function in terms of the separation matrix, wherein the introduced cost function is an exponential type function.

4. A signal separation method according to claim 2, wherein the cost function is a nonlinear function of a product of the Hermitian conjugate of the separation matrix multiplied by a set of the observed data.

5. A signal separation method according to claim 4, wherein the cost function is a nonlinear function alterable in response to kurtosis of observed data signals.

6. A signal separation method according to claim 2, wherein the cost function is a nonlinear function alterable in response to kurtosis of observed data signals.

7. A method for separating and extracting original signals from observed signals where multiple multidimensional signals including the original signals are mixed, the method comprising the steps of:
   reading the observed signals;
   transforming a data structure in terms of the read observed signals;
   subtracting an average of the observed signals from each of the observed signals, which data structure has been transformed to perform zero averaging;
   performing whitening on the observed signals that have undergone zero averaging;
   performing separation processing on the observed signals that have undergone whitening based on a cost function having a monotonously increasing characteristic; and
   performing inverse whitening as post-processing on the observed signals that have undergone the separation processing.

8. A signal processing apparatus, comprising:
   means for inputting observed data where multiple signals including original multidimensional signals are mixed;
   means for selecting a specific separation matrix by optimizing at least either one of H-infinity norm type of cost function or MinMax strategy type of cost function for the input observed data; and
   means for multiplying the observed data by the selected separation matrix to estimate and restore the original multidimensional signals.

9. A signal processing apparatus, comprising:
   means for inputting observed data where multiple multidimensional signals that are originally independent are mixed mutually;
   means for estimating a separation matrix by using an adaptive filter for the input observed data, the filter optimizing a cost function based on a function that has a monotonously increasing characteristic; and
   means for multiplying the observed data by the estimated separation matrix to estimate and restore the specific multidimensional signals.

10. The signal processing apparatus according to claim 9, wherein the observed data input by the input means comprises given image data that consist of mixtures of moving picture data that are considered as three dimensional data.

11. An image processing apparatus, comprising:
   means for inputting mixed image data where multiple image signals are mixed and observed;
   means for estimating a separation matrix by using an adaptive filter for the input mixed image data, the filter optimizing a cost function based on a function having a monotonously increasing characteristic; and means for multiplying the mixed image data by the estimated separation matrix to separate and extract the image signals from the mixed image data.

12. The image processing apparatus according to claim 11, wherein the adaptive filter used minimizes the cost function in terms of the separation matrix, and the function having a monotonously increasing characteristic is an exponential type function.

13. The image processing apparatus according to claim 11, wherein the input mixed image data comprises text overwritten on a background image and are observed as multiple frames.

14. The image processing apparatus according to claim 11, wherein the image signals that are separated and extracted are image signals that are used in face recognition and distinction in biometrics or image signals that are obtained by the observation and measurement by satellites.

15. An image processing apparatus according to claim 11, wherein the cost function is a nonlinear function of a product of the Hermitian conjugate of the separation matrix multiplied by the mixed image data.

16. An image processing apparatus according to claim 15, wherein the cost function is a nonlinear function alterable in response to kurtosis of observed data signals.

17. An image processing apparatus according to claim 11, wherein the cost function is a nonlinear function alterable in response to kurtosis of observed data signals.

18. A medical image processing apparatus, comprising:
means for inputting medical image data where a signal change of which interference process is unknown is contained in observed bio-image signals;
means for estimating a separation matrix by using an adaptive filter for the input medical image data, the filter optimizing a cost function based on a function having a monotonously increasing characteristic; and
means for multiplying the medical image data by the estimated separation matrix to separate and extract the observed bio-image signals from the medical image data.

19. A storage medium tangibly embodying a program readable and executable by a computer, the program comprising:
processing for introducing a cost function for observed data where multiple multidimensional signals are mixed, the cost function being based on a function that has a monotonously increasing characteristic;
processing for estimating a separation matrix using an adaptive filter that optimizes the introduced cost function; and
processing for multiplying the observed data by the estimated separation matrix to estimate and restore the specific multidimensional signals.

20. A storage medium tangibly embodying a program readable and executable by a computer, the program comprising:
processing for selecting a specific separation matrix by optimizing at least either one of H-infinity norm type of cost function or MinMax strategy type of cost function for observed data where multiple multidimensional signals are mixed; and
processing for multiplying the observed data by the selected separation matrix to estimate and restore the specific multidimensional signal.

* * * * *